(12) United States Patent
Plow et al.

(10) Patent No.: US 6,732,086 B2
(45) Date of Patent: *May 4, 2004

(54) METHOD FOR LISTING SEARCH RESULTS WHEN PERFORMING A SEARCH IN A NETWORK

(75) Inventors: Gregory Maurice Plow, Gilroy, CA (US); Farrokh E. Pourmirzaie, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,299

(22) Filed: Sep. 7, 1999

(65) Prior Publication Data

US 2002/0169856 A1 Nov. 14, 2002

(51) Int. Cl.[7] ............................................. G06F 17/30
(52) U.S. Cl. .............................. 707/3; 707/10; 707/4
(58) Field of Search ........................ 707/4, 3, 10, 513, 707/5, 102

(56) References Cited

U.S. PATENT DOCUMENTS

| | | | | |
|---|---|---|---|---|
| 5,765,149 A | * | 6/1998 | Burrows | 707/5 |
| 5,842,206 A | | 11/1998 | Sotomayor | |
| 5,847,708 A | | 12/1998 | Wolff | |
| 5,850,442 A | | 12/1998 | Muftic | |
| 5,852,810 A | | 12/1998 | Sotiroff et al. | |
| 5,855,020 A | * | 12/1998 | Kirsch | 707/10 |
| 5,873,076 A | * | 2/1999 | Barr et al. | 707/3 |
| 5,907,837 A | * | 5/1999 | Ferrel et al. | 707/3 |
| 5,913,215 A | * | 6/1999 | Rubinstein et al. | 707/10 |
| 5,983,268 A | * | 11/1999 | Freival et al. | 70/218 |
| 5,987,454 A | * | 11/1999 | Hobbs | 707/4 |
| 6,006,252 A | * | 12/1999 | Wolfe | 709/203 |
| 6,073,167 A | * | 6/2000 | Poulton et al. | 709/206 |
| 6,182,065 B1 | * | 1/2001 | Yeomans | 707/3 |
| 6,334,126 B1 | * | 12/2001 | Nagatomo et al. | 707/4 |
| 6,356,899 B1 | * | 3/2002 | Chakrabarti et al. | 707/5 |
| 6,366,906 B1 | * | 4/2002 | Hoffman | 707/3 |
| 6,397,210 B1 | * | 5/2002 | Stern et al. | 707/3 |

FOREIGN PATENT DOCUMENTS

WO    WO 9837499    8/1998

OTHER PUBLICATIONS

Research Outlet and Integration/ROI JV, What is twURLtm, 1996, 1997 ROI JV.*

* cited by examiner

*Primary Examiner*—Jean M. Corrielus
(74) *Attorney, Agent, or Firm*—Sawyer Law Group LLP (57) ABSTRACT

The present invention provides a method and system for listing network search results. The network has a plurality of sites. Each site has a plurality of pages. The method and system comprise searching the network based on a search term and saving original results from the search and modifying the results of the search wherein at least one of the plurality of pages of a site containing the search term is excluded from reference in the search results and a reference to the home page of the site is included in the search results. Through the use of a method and system in accordance with the present invention, the number of result hits listed on the results list produced by a web search engine will be dramatically reduced. Tens or hundreds of result pages are potentially eliminated. A user will also be able to quickly locate web pages, within each of the individually listed web sites, that contain the search term(s). As a result, a user within a network system such as the Internet is no longer burdened with having to review page after page of irrelevant information related to his/her searches, where the information is duplicative or undesirable because of its relation to a web site that is of no interest to the user.

21 Claims, 11 Drawing Sheets

PRIOR ART

FIG. 1

_____________________________________ 20 pine mountain lake | search

- About Pine Mountain Lake — 22
  http://www.pinemountainlake.com/about4.html
- Realty World - Pine Mountain Lake Realty
  http://www.pmlr.com/ ——— 24
- About Pine Mountain Lake
  http://www.pinemountainlake.com/about.html
- Pine Mountain Lake Campground
  http://www.pinemountainlake.com/camp.html
- Pine Mountain Lake Airport
  http://www.pinemountainlake.com/airport.html
- Where is Pine Mountain Lake
  http://www.pmlr.com/sec1.htm
- Pine Mountain Lake Equestrian Center
  http://www.pinemountainlake.com/equestrian.html
- Realty World Pine Mountain Lake Realty - Waterfront
  http://www.pmlr.com/water.htm
- Pine Mountain Lake
  http://www.pmlr.com/sec2.htm
- Pine Mountain Lake - California Online Highways
  http://www.caohwy.com/p/pinemlak.htm
- Realty World Pine Mountain Lake Realty Golf Course Home w/Lake View
  http://www.pmlr.com/uS198.htm
- Realty World Pine Mountain Lake Realty - Double your Pleasure
  http://www.pmlr.com/u71128.htm
- Realty World Pine Mountain Lake Realty - Attention Pilots!
  http://www.pmlr.com/u12154.htm
- Realty World Pine Mountain Lake Realty - 1 112
  http://www.pmlr.com/1_112.htm
- Realty World Pine Mountain Lake Realty - 8 70
  http://www.pmlr.com/8_70.htm
- Realty World Pine Mountain Lake Realty - 2 131
  http://www.pmlr.com/2_131.htm
- Realty World Pine Mountain Lake Realty - 1 261
  http://www.pmlr.com/1_261.htm
- Realty World Pine Mountain Lake Realty - 5 166
  http://www.pmlr.com/5_166.htm
- Realty World Pine Mountain Lake Realty - 15 121
  http://www.pmlr.com/15_121.htm
- Realty World Pine Mountain Lake Realty - 1 138
  http://www.pmlr.com/1_138.htm
- Realty World Pine Mountain Lake Realty - 4 582
  http://www.pmlr.com/4_582.htm
- Realty World Pine Mountain Lake Realty - 4 310
  http://www.pmlr.com/4_310.htm << back - next >>

PRIOR ART

METHOD FOR LISTING SEARCH RESULTS WHEN PERFORMING A SEARCH IN A NETWORK

FIELD OF INVENTION

The present invention relates generally to listing search results and particularly to displaying the search results in an optimized manner.

BACKGROUND OF THE INVENTION

Figure 1:
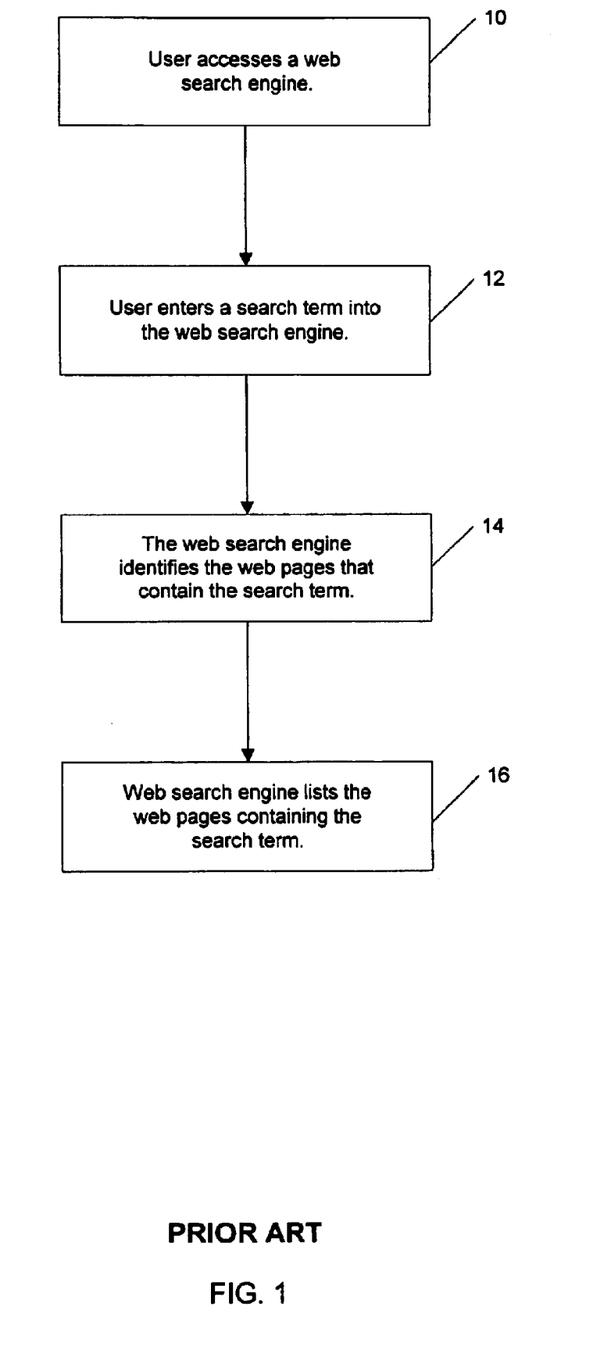
FIG. 1 shows a flowchart of a conventional web search.

Computer networking systems such as the Internet are exploding in popularity all over the world. There are many reasons for this phenomenal growth, not the least of which is the ability to discover and access needed information in an efficient manner. The power of the Internet enables the average person with very little technical training to search for information in minutes instead of days, weeks, or even months of searching libraries, telephone books, directories or other conventional research means. To better understand conventional Internet search technology, refer now to FIG. 1. FIG. 1 represents a flowchart of how an Internet user performs a conventional web search.

First, the Internet user accesses a web search engine, via step 10. Next, the Internet user enters a search term(s) into the web search engine, via step 12. The web search engine then identifies the web pages that contain the search term(s), via step 14. Finally, the web pages containing the search term(s) are listed by the search engine, via step 16.

However, as more and more information comes online, at accelerating rates, today's search engine interfaces and features are not keeping pace. Searches that would have previously produced less than a dozen relevant documents are now producing hundreds of documents. This is making it very difficult and time consuming for the Internet user to evaluate and investigate the results. More sophisticated searches, sometimes beyond the grasp of a non-professional researcher, are not always the answer as the narrower searches introduce greater risk of eliminating relevant and useful information. The severity of this problem is growing day by day at an ever-increasing rate.

One of the circumstances greatly exacerbating this problem is the tendency of web page developers to add large numbers of keywords to each and every page of their web site as a strategy to boost their standings with the Internet search engines. Thus, a single web site, which an Internet user may decide is not relevant after accessing the web site home page, may produce dozens or even hundreds of result pages listed in the search results. FIG. 2 shows a typical web search results list. The search term(s) 20 appears on multiple web pages of the "www.pinemountainlake.com" 22 and "www.pmlr.com" 24 web sites. Even with enhanced bandwidth and greater network speeds, wading through hundreds of these "hits" to move to the next interesting web site is inefficient, cumbersome and annoying. An Internet user may actually lose patience after viewing dozens of pages of results with redundant information and terminate his search prematurely missing the relevant page buried deep down in the list.

On some occasions an Internet user may actually want to have the results display all pages of a single web site found by the search engine as meeting the Internet user's Internet search criteria. However, most of the time, the Internet user wants to find a list of relevant and interesting web sites related to his search criteria. If only one of ten found Internet web sites is relevant, it is tedious and unproductive to review and skip over numerous "hits" for each of the other nine web sites. For example, the user may determine that the needed detailed information at a web site is only available through a paid subscription service at a price higher than he is willing to pay. In this case, the user would prefer to not see the numerous hits for pages from this site. In another example, a found web site may only serve wholesale customers when the Internet user is only interested in a retail purchase. Once again, the numerous "hits" for pages from this web site would not be interesting to this user.

There is another limitation in search engine and browser technology that is an increasing source of frustration to users of today's search engines. When accessing a single result page, the "find" function of the browser will only display items on that single page matching the find criteria. Thus, once the Internet user has arrived at a list of potentially interesting and relevant web sites, it may be difficult, especially if the web site is robust with many pages, to find the particular page or pages containing the desired information. Using the page by page results list from the search engine can be equally frustrating in that the orientation and navigational information needed by the Internet user may not be evident by jumping to a single page within the web site structure.

What is needed is a search engine that can reduce the number of hits listed for a search. For example, a search engine could be directed to return first the home page of each web site that contains one or more pages meeting the Internet users search criteria. The user should then be able to quickly locate the relevant pages of each of the individually listed web sites. This will dramatically reduce the number of result "hits" listed on the results list produced by a web search engine. Since many search requests produce multiple web page references for a single web site, tens or even hundreds of web page references may be redundant from the user's perspective and therefore can be eliminated from the results.

SUMMARY OF THE INVENTION

The present invention provides a method and system for listing network search results. The network has a plurality of sites. Each site has a plurality of pages. The method and system comprise searching the network based on a search term and saving original results from the search and modifying the results of the search wherein at least one of the plurality of pages of a site containing the search term is excluded from reference in the search results and a reference to the home page of the site is included in the search results.

Through the use of a method and system in accordance with the present invention, the number of result hits listed on the results list produced by a web search engine will be dramatically reduced. Tens or hundreds of result pages are potentially eliminated. A user will also be able to quickly locate web pages, within each of the individually listed web sites, that contain the search term(s). As a result, a user within a network system such as the Internet is no longer burdened with having to review page after page of irrelevant information related to his/her searches, where the information is duplicative or undesirable because of its relation to a web site that is of no interest to the user.

BRIEF DESCRIPTION OF THE DRAWINGS

FIG. 2 shows a typical web search results list.

DETAILED DESCRIPTION OF THE INVENTION

The present invention provides a method and system for reducing the number of hits of an Internet search result. The following description is presented to enable one of ordinary skill in the art to make and use the invention and is provided in the context of a patent application and its requirements. Although the present invention has been described in the context of being used with the Internet, one of ordinary skill in the art will readily recognize that the present system can be used in conjunction with any type of networking system while remaining within the spirit and scope of the present invention. Accordingly, various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

A method and system in accordance with the present invention is disclosed in the context of a preferred embodiment. The preferred embodiment allows for the implementation of a web-searching tool that lists only the home pages representing each of the relevant web sites. This will dramatically reduce the number of result "hits" listed on the results list produced by a conventional web search engine. Tens or hundreds of result pages are potentially eliminated as redundant or useless information identifying a given web site is excluded from the results. A user will also be able to quickly locate web pages within each of the individually listed web sites that contain the search term(s).

Figure 3A:
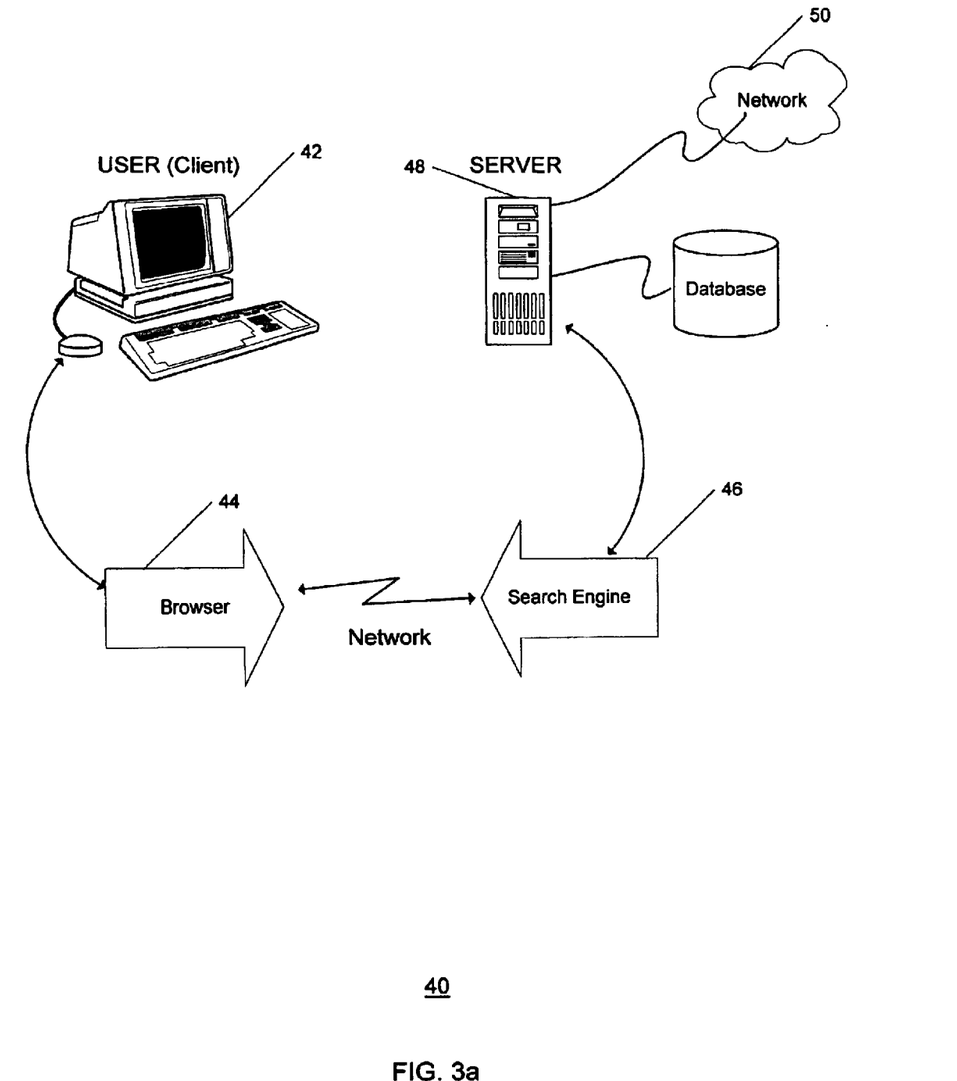
FIG. 3a is a computer system configuration in accordance with the present invention.

To better understand the system in accordance with the present invention, refer now to FIG. 3a. FIG. 3a illustrates a typical computer system configuration 40 for the implementation of the system in accordance with the present invention. A user 42 utilizes a browser 44 to access a server 48. The user 42 can then access a search engine 46 and search a network 50 for information.

Figure 3B:
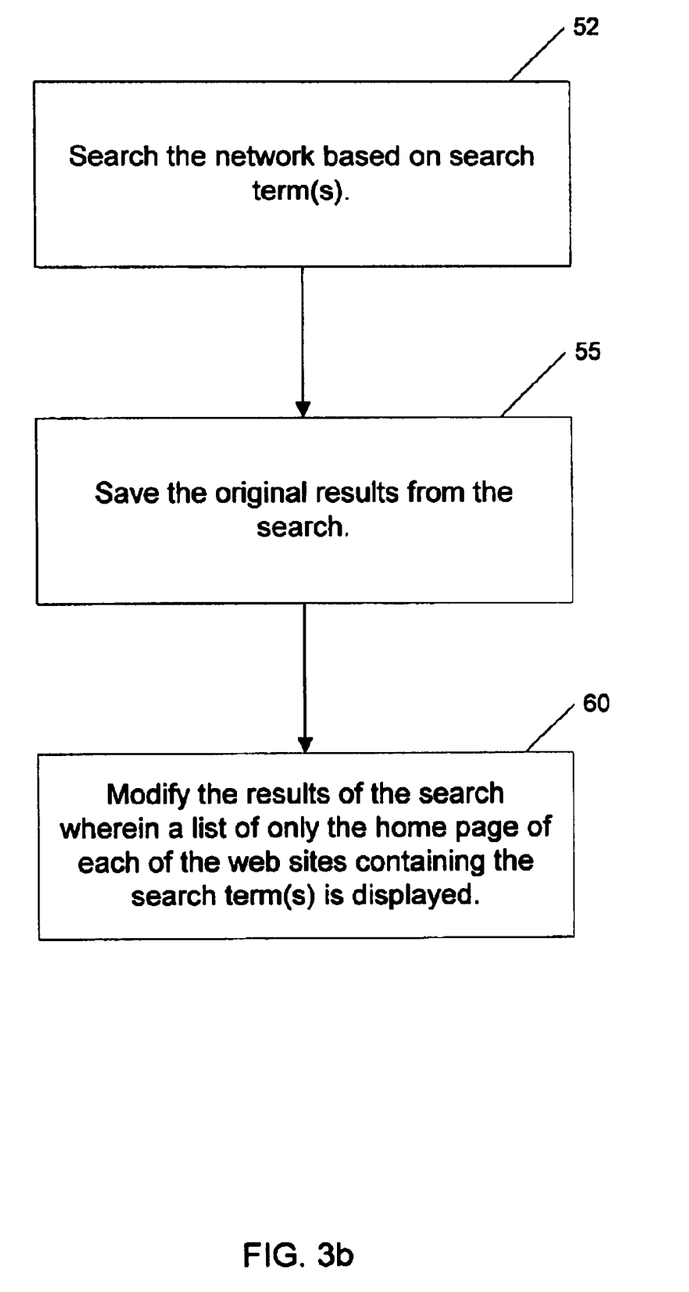
FIG. 3b is a high-level flowchart of a method in accordance with the present invention.

To further understand the operation of the method in accordance with the present invention, refer now to FIG. 3b. First, a network 50 is searched based on a search term(s), via step 52. Preferably step 52 includes searching all the pages of all the web sites in the network 50, to find the pages that contain the search term(s). Next, the original results from the search are saved, via step 55. Next a list of only the home page for each of the web sites containing the search term(s) is displayed via step 60. Thus, reference to multiple pages associated with a web site are replaced by a single reference to the web site's home page.

Figure 4:
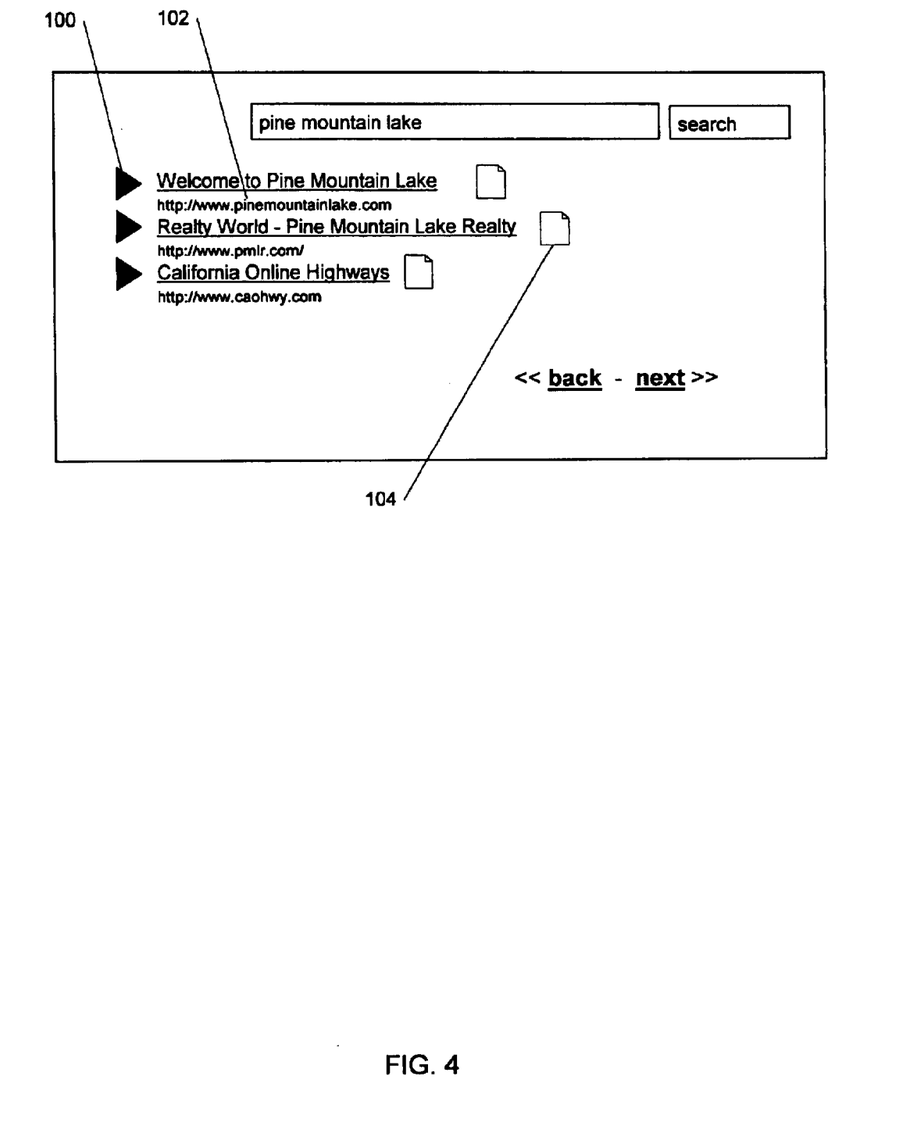
FIG. 4 shows a web search results list in accordance with the present invention.

Another aspect of the system and method in accordance with the present invention is the ability to quickly navigate a web site to find relevant information by indexing and mapping respective web sites. Preferably this is done via the incorporation of two small buttons next to each web site listed in the search results. FIG. 4 depicts a web search results list in accordance with the present invention. The indexing button 100 reflects an option to invoke the "indexing" function for the associated web site 102, while the mapping button 104 reflects an option to invoke the "mapping" function for the associated web site 102. The indexing button 100 is preferably represented by an arrow icon, while the mapping button 104 is preferably represented by a page icon.

Figure 5:
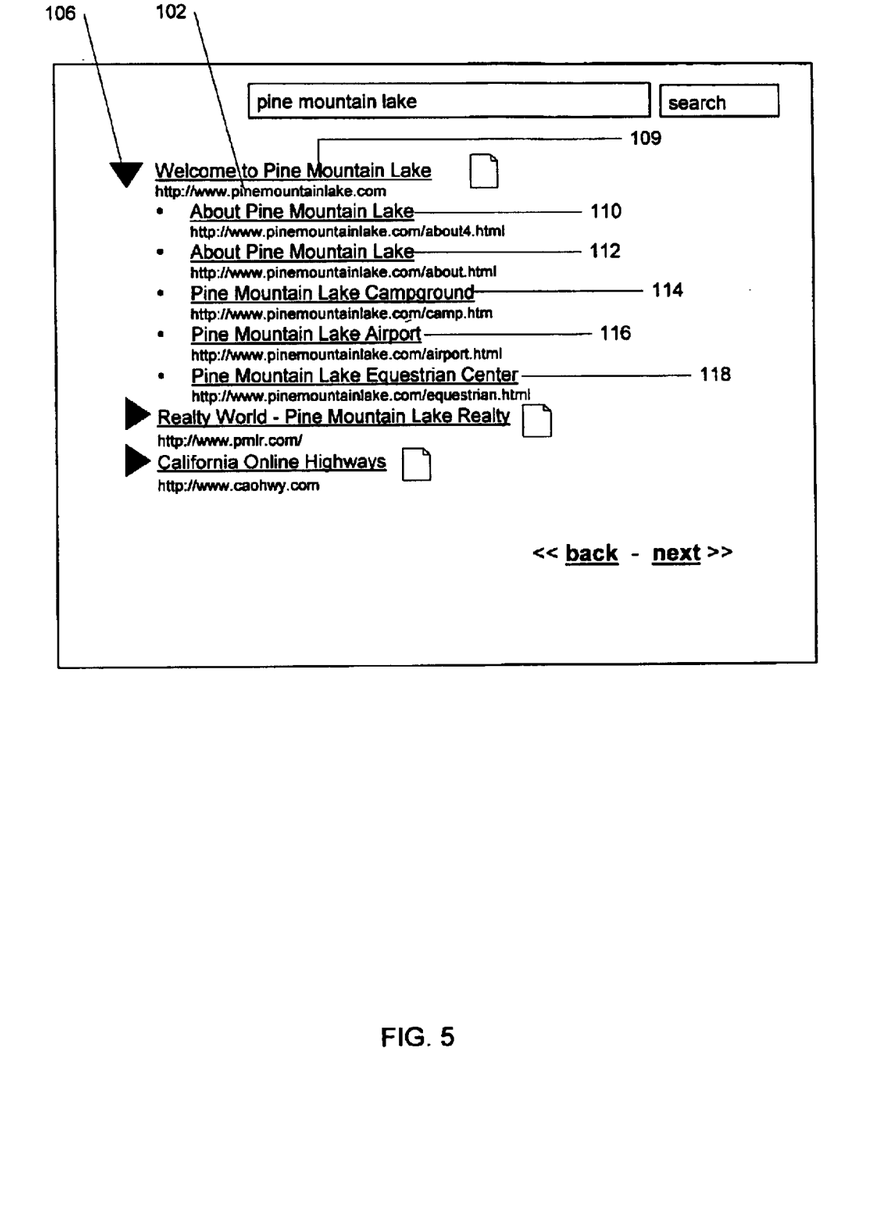
FIG. 5 is a depiction of the indexing function of the system in accordance with the present invention.

Upon pushing the indexing button 100, a graphical illustration of the web site index is displayed. An index is a list of web page references within a single web site that contain a user specified search term(s). Please refer now to FIG. 5 for a depiction of the graphical illustration of the indexing function of the associated web site 102. This illustration shows that the index for web site 102 comprising the web page references 110, 112, 114, 116, 118 is displayed underneath the home page reference 109 of the associated web site 102. Preferably, once the indexing function has been invoked, the arrow icon 106 will point in a downward direction to indicate that the index list is being displayed. The user can then select a particular web page reference of interest. The web page associated with that particular reference is then accessed. Upon pushing the arrow icon 106 again, the index for web site 102 collapses and once again only the home page reference 109 is displayed.

Figure 6:
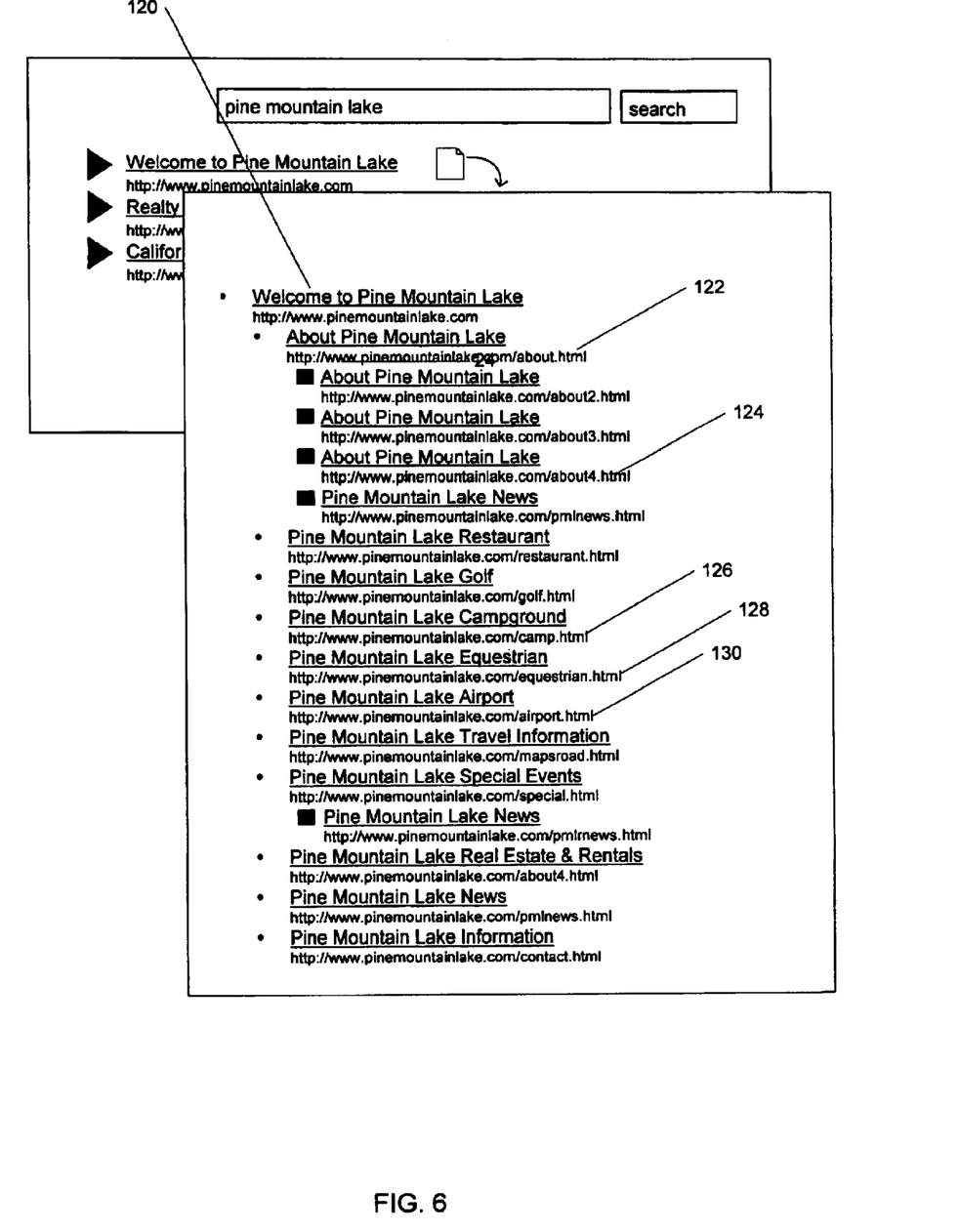
FIG. 6 is a depiction of the mapping function of the system in accordance with the present invention.

Alternatively, upon pushing the mapping button 104, a graphical illustration of the web site pages is displayed. Please refer now to FIG. 6 for a depiction of the graphical illustration of the mapping function of the associated web site 102. Preferably, once the mapping function for the associated web site 102 has been invoked, all the pages of the associated web site 102 are identified and displayed in a separate window, wherein the web pages 122, 124, 126, 128, 130 containing the search term(s) are highlighted. All other web pages within a web site are listed (but not highlighted) to provide a point of reference to the user. The user may review pages before or after the highlighted pages to better understand the context within which the search term is found. Thus, by using the indexing and/or mapping function, a user can quickly access any pages of interest without having to review page after page of irrelevant information.

Figure 7:
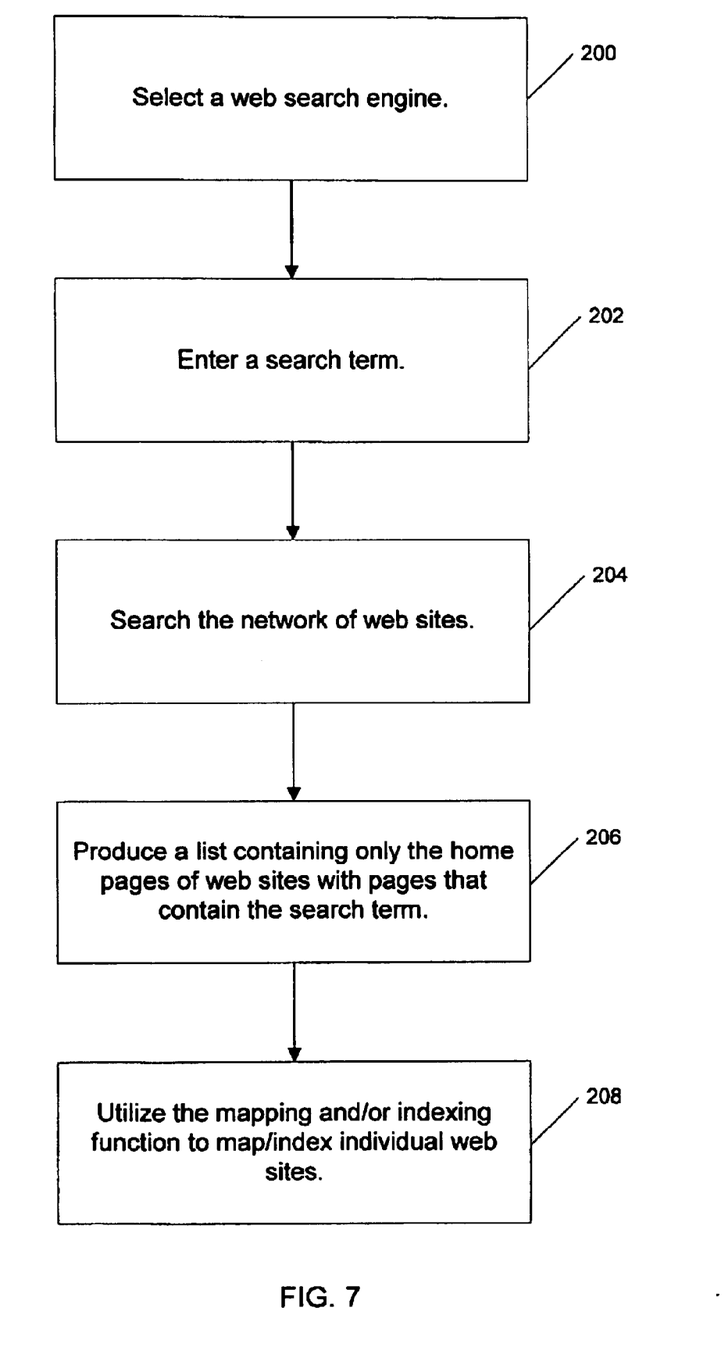
FIG. 7 is a detailed flowchart of a method in accordance with the present invention.

To describe the operation of the method and system in accordance with the present invention, refer now to FIG. 7. FIG. 7 is a detailed flowchart of a method in accordance with the present invention. First, after accessing a network of web sites, a user selects a web search engine in accordance with the present invention, via step 200. Next, a search term(s) is provided to the web search engine by the user, via step 202. Next, the search engine searches the network of web sites based on the search term(s) entered, via step 204. A list of only the web home pages of the web sites with pages that contain the search term(s) is then produced, via step 206. Thus, multiple page references for a given web site are eliminated. Finally, the user can utilize the mapping and/or indexing function of the individual web sites listed to display a more detailed list of related web pages, via step 208.

Figure 8:
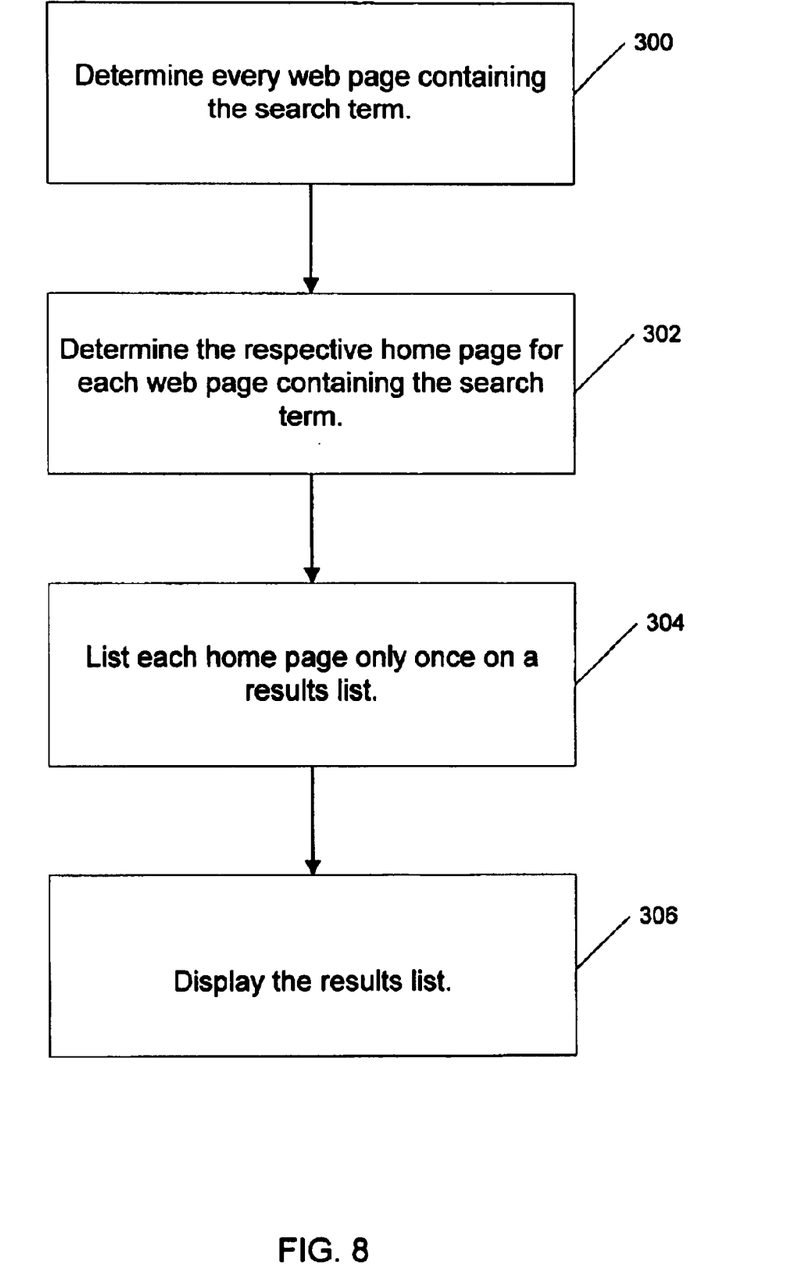
FIG. 8 is a detailed flowchart of a portion of FIG. 7.

To better understand the operation of the system and method in accordance with the present invention, FIG. 8 is a more detailed description of a preferred embodiment of step 206 of the flowchart of FIG. 7. First, the web pages containing the search term(s) are determined, via step 300. Next, for the web pages containing the search term(s), the respective home page is determined, via step 302. Preferably this can be done by taking the Uniform Resource Locator (URL) of a web page containing the search term(s) and, starting from the left, dropping all characters after the first single slash (/). (E.g., the home page of www.pinemountainlake.com/about4.html is www.pinemountainlake.com/.) However, one of ordinary skill in the art will readily recognize that a variety of other methods could be implemented to determine the home page of a respective web page while remaining within the spirit and scope of the present invention.

Next, each home page determined is listed only once on a results list, via step 304. Finally, the results list is displayed via step 306.

Figure 9:
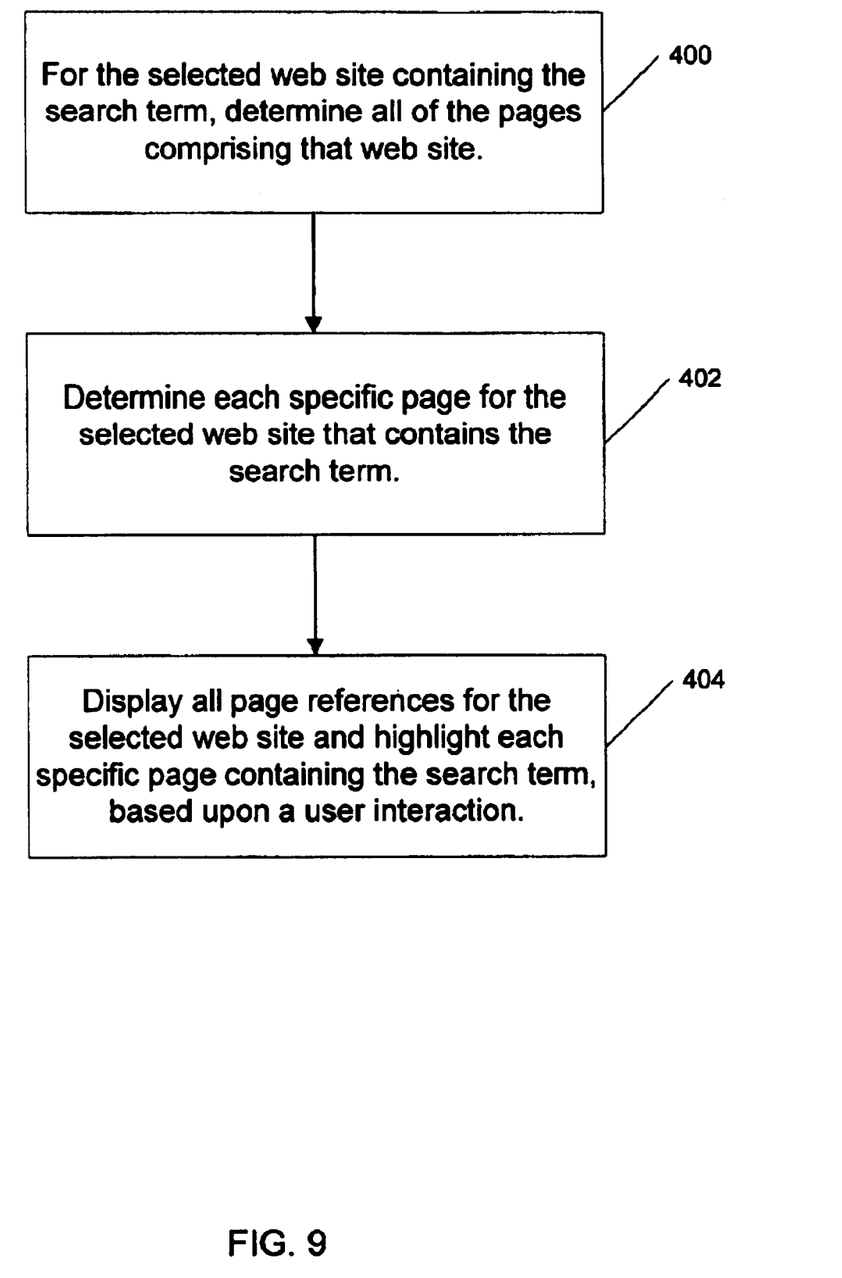
FIG. 9 is a detailed flowchart of the mapping function of FIG. 7.

To further understand the system and method in accordance with the present invention, FIG. 9 is a more detailed description of the mapping function of step 208 of the flowchart of FIG. 7. First, for the web site containing the search term to be mapped determine all the web pages comprising that web site, via step 400. Preferably this can be done by invoking a "spider" program. A spider program is a program that automatically traverses the web's hypertext structure by retrieving a document, and recursively retrieving all documents that are referenced. However, one of ordinary skill in the art will readily recognize that a variety of other methods could be implemented to determine all web pages within a web site and their relationships while remaining within the spirit and scope of the present invention.

Next, each specific page of the selected web site that contains the search term(s) is determined, via step 402. References to all pages of the mapped web site are displayed and the reference for each specific page containing the search term(s) is displayed and highlighted based upon a user interaction, via step 404. In step 404, the references of pages that do not contain the search term(s) are preferably not highlighted. The user interaction which invokes the mapping function of step 208 is preferably the depressing of a "mapping" button located next to each home page obtained in the search, but one of ordinary skill in the art will recognize that variety of user interactions could be implemented.

Figure 10:
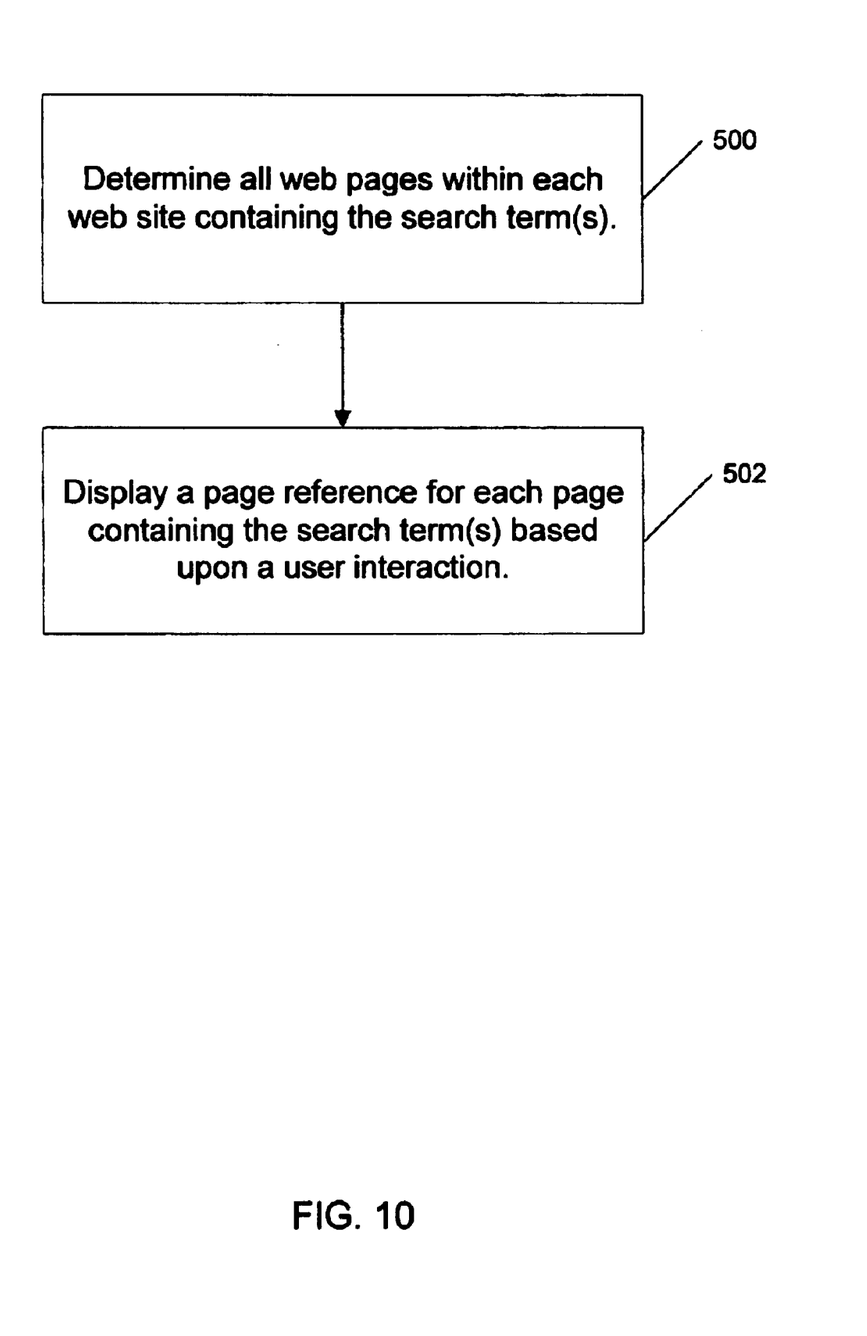
FIG. 10 is a detailed flowchart of the indexing function of FIG. 7.

For a more detailed description of the indexing function of step 208 of the flowchart of FIG. 7, refer now to the flowchart of FIG. 10. First, all the web pages within each web site containing the search term(s) are determined, via step 500. Next, a reference to each page containing the search term(s) is displayed based upon a user interaction, via step 502. The user interaction which invokes the indexing function of step 208 is preferably the depressing of an "indexing" button located next to each home page obtained in the search, but one of ordinary skill in the art will recognize that variety of user interactions could be implemented.

The system and method in accordance with the present invention allows for the elimination of tens or even hundreds of the result pages associated with network related searches. As a result of this invention, the network user will no longer be burdened with reviewing page after page of redundant or useless information related to network searches. While the user can choose an option to have the search engine behave as it does today, most users of networks like the Internet, will quickly embrace this new enhancement for their searches.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for organizing network search results, the network having a plurality of sites, one or more sites having a plurality of pages, the plurality of pages including a home page, the method comprising:

(a) searching the network based on a search term and saving search results, the search results comprising the pages that contain the search term;

(b) determining a reference to a home page associated with each of the pages in the search results; and (c) displaying only the reference to the home page.

2. The method of claim 1 wherein the reference to the home page is displayed even if the home page does not contain the search term.

3. The method of claim 1 further comprising the step of (d) invoking an index function, wherein a second reference to at least one page containing the search term is displayed, and wherein the at least one page is associated with the home page.

4. The method of claim 3 wherein the index function invoking step (d) comprises the step of (d1) displaying the second reference as a sublisting of the displayed reference to the home page.

5. The method of claim 1 further comprising the step of (d) invoking a mapping function, wherein references to the pages associated with the home page are displayed, and wherein the references to the pages associated with the home page are displayed even if the pages do not contain the search term.

6. The method of claim 5 wherein the mapping function invoking step (d) comprises the step of (d1) displaying the references to the pages associated with the home page in a separate window.

7. The method of claim 5 further comprising the step of (e) highlighting the references to the pages containing the search term.

8. A system for organizing network search results, the network having a plurality of sites, one or more sites having a plurality of pages, the plurality of pages including a home page, the system comprising:

means for searching the network based on a search term and saving search results, the search results comprising the pages that contain the search term;

means for determining a reference to a home page associated with each of the pages in the search results; and means for displaying only the reference to the home page.

9. The system of claim 8 wherein the reference to the home page is displayed even if the home page does not contain the search term.

10. The system of claim 8 further comprising means for invoking an index function, wherein a second reference to at least one page containing the search term is displayed, and wherein the at least one page is associated with the home page.

11. The system of claim 10 further comprising means for displaying the second reference as a sublisting of the displayed reference to the home page.

12. The system of claim 8 further comprising means for invoking a mapping function, wherein references to the pages associated with the home page are displayed, and wherein the references to the pages associated with the home page are displayed even if the pages do not contain the search term.

13. The system of claim 12 further comprising means for displaying the references to the pages associated with the home page in a separate window.

14. The system of claim 12 further comprising means for highlighting the references to the pages containing the search term.

15. A computer readable medium containing program instructions for organizing network search results, the network having a plurality of sites, one or more sites having a plurality of pages, the plurality of pages including a home page, the program instructions comprising:

(a) searching the network based on a search term and saving search results, the search results comprising the pages that contain the search term;

(b) determining a reference to a home page associated with each of the pages in the search results; and (c) displaying only the reference to the home page.

16. The computer readable medium of claim 15 wherein the reference to the home page is displayed even if the home page does not contain the search term.

17. The computer readable medium of claim 15 further comprising program instructions for the step of (d) invoking an index function, wherein a second reference to at least one page containing the search term is displayed, and wherein the at least one page is associated with the home page.

18. The computer readable medium of claim 17 wherein the index function invoking step (d) comprises the step of (d1) displaying the second reference as a sublisting of the displayed reference to the home page.

19. The computer readable medium of claim 15 further comprising program instructions for the step of (d) invoking a mapping function, wherein references to the pages associated with the home page are displayed, and wherein the references to the pages associated with the home page are displayed even if the pages do not contain the search term.

20. The computer readable medium of claim 19 wherein the mapping function invoking step (d) comprises the step of (d1) displaying the references to the pages associated with the home page in a separate window.

21. The computer readable medium of claim 19 further comprising program instructions for the step of (e) highlighting the references to the pages containing the search term.

* * * * *